US 6,704,858 B1

(12) United States Patent
Sugimoto

(10) Patent No.: US 6,704,858 B1
(45) Date of Patent: Mar. 9, 2004

(54) INFORMATION PROCESSOR AND METHOD FOR SWITCHING THOSE REGISTER FILES

(75) Inventor: Hideki Sugimoto, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 685 days.

(21) Appl. No.: 09/589,963

(22) Filed: Jun. 8, 2000

(30) Foreign Application Priority Data

Jun. 9, 1999 (JP) .......................................... 11-162784

(51) Int. Cl.⁷ ................................................ G06F 9/00
(52) U.S. Cl. ...................... 712/228; 712/229; 709/108
(58) Field of Search ............................... 712/228, 229, 712/220, 225, 232, 245, 248, 209, 36, 23, 216; 709/100, 107, 108; 711/104, 100

(56) References Cited

U.S. PATENT DOCUMENTS

| | | | | |
|---|---|---|---|---|
| 4,215,396 A | * | 7/1980 | Henry et al. .................... 700/7 |
| 5,226,142 A | * | 7/1993 | Vegesna et al. ......... 365/230.02 |
| 5,642,523 A | * | 6/1997 | Sakaue .......................... 712/41 |
| 5,764,938 A | * | 6/1998 | White et al. ................. 712/200 |
| 5,870,597 A | * | 2/1999 | Panwar et al. ............... 712/230 |
| 6,128,728 A | * | 10/2000 | Dowling ..................... 712/228 |
| 6,282,633 B1 | * | 8/2001 | Killian et al. ............... 712/208 |
| 6,408,325 B1 | * | 6/2002 | Shaylor ....................... 709/108 |

FOREIGN PATENT DOCUMENTS

| | | |
|---|---|---|
| JP | 63-156236 | 6/1988 |
| JP | 3-35324 | 2/1991 |
| JP | 7-64857 | 3/1995 |

* cited by examiner

Primary Examiner—Henry W. H. Tsai
(74) Attorney, Agent, or Firm—Dickstein, Shapiro, Morin & Oshinsky, LLP.

(57) ABSTRACT

An information processor has a first register file used when a first instruction is executed and a second register file used when a second instruction is used. When the second instruction is called from the first instruction, the second register file is activated and the first register file is deactivated, when the second instruction is called from said first instruction. So, when the second instruction is executed, if a data used in the second instruction is not written into the second register file, the data is obtained from the first register file, and if it is written, the data is obtained from the second register file. Then, the execution result of the second instruction based on the obtained data is written into the second register file. Accordingly, it is possible to provide an information processor that can quickly switch the register files without the influence of the number of parameters to be transferred, and a method for switching the register files.

18 Claims, 8 Drawing Sheets

INFORMATION PROCESSOR AND METHOD FOR SWITCHING THOSE REGISTER FILES

BACKGROUND OF THE INVENTION

1. Field of the Invention

The present invention relates to an information processor equipping a plurality of register files and to a method for switching those register files. More particularly, the present invention relates to a technique for reducing an overhead associated with an operation for switching those register files.

2. Description of the Related Art

Conventionally, an information processor equipping a plurality of register files has been well known. In this information processor, typically, a first register bank is assigned to a main routine, and a second register bank is assigned to a sub routine. When the sub routine is called from the main routine, the first register bank is switched to the second register bank. Also, when the sub routine is returned to the main routine, the second register bank is switched to the first register bank.

When the bank switching operation mentioned above is performed, in order to maintain a continuity between a process in the main routine and anther process in the sub routine, it is required that a content of a second register file constituting the second register bank for the sub routine agrees with a content of a first register file constituting the first register bank for the main routine. To accomplish this requirement, the following technique as been conventionally employed.

In a first conventional technique for the bank switching operation, such a method is employed that when the sub routine is called from the main routine, a first register bank used until that time is switched to a second register bank, and also a content of a first register file is copied to a second register file. In this case, there are a case of copying the entire content of the first register file, and a case of copying only a necessary portion of the content of the first register file. It should be noted that when the sub routine is returned to the main routine, only a process result obtained in the sub routine is returned to a particular register of the first register file by executing a special instruction immediately before this return.

FIG. 1 shows a block diagram representing a configuration of an information processor employing this first conventional technique. This information processor is composed of an instruction register 50, an instruction decoder 51, a first register file 52, a second register file 53, a selector 54, a selector 55, a bank switching control circuit 56 and an operation unit 57.

The instruction register 50 transiently stores therein an instruction read out from a main memory by using an instruction fetching mechanism (not shown). A content of this instruction register 50 is sent to the instruction decoder 51. The instruction decoder 51 extracts a register designation section in an instruction stored in the instruction register 50, and then sends as a register address RA to the first register file 52 and the second register file 53. This register address RA includes a read address RDA and a write address WRA.

Also, the instruction decoder 51 decodes an operation code section in the instruction, and generates a bank switch signal BK, a register transfer signal RT and an operation signal OP. The bank switch signal BK includes a signal CALL and a signal RET. The signal CALL is generated when a call instruction is set in the instruction register 50, and the signal RET is generated when a return instruction is set in the instruction register 50. The register transfer signal RT is generated when a register transfer instruction is set in the instruction register 50. This register transfer instruction is used to transfer a content of the first register file 52 to the second register file 53. Moreover, the operation signal OP is generated when instructions except the call instruction, the return instruction and the register transfer instruction, for example, various instructions such as an arithmetic operation instruction, a logical operation instruction, a comparison instruction and a movement instruction are set in the instruction register 50.

The first register file 52 is composed of 32 registers, and is used when a main routine is executed. When the register address RA from the instruction decoder 51 is sent to the first register file 52, a data is read out from a register specified by the read address RDA, within the first register file 52. This read out data is sent to an input terminal A of the selector 54 and an input terminal A of the selector 55. Also a data from the operation unit 57 is written to a register specified by the write address WRA, within the first register file 52 when the main routine is being executed.

The second register file 53 is composed of 32 registers, and is used when a sub routine is executed. When the register address RA from the instruction decoder 51 is sent to the second register file 53, a data is read out from a register specified by the read address RDA, within the second register file 53. This read out data is sent to an input terminal B of the selector 55. Also the data from the operation unit 57 is written to a register specified by the write address WRA, within the second register file 53 when the sub routine is being executed.

The selector 54 selects the data from the first register file 52 entered to the input terminal A or the data from the operation unit 57 entered to the input terminal B in accordance with the register transfer signal RT sent to a select terminal S, and sends the selected data to the second register file 53. That is, the input terminal A of the selector 54 is selected when the register transfer signal RT sent from the instruction decoder 51 is applied to the select terminal S of the selector 54. Accordingly, the data from the first register file 52 is directly transferred to the second register file 53 through this selector 54 (the data is not transferred through the operation unit 57). On the other hand, the input terminal B is selected when the register transfer signal RT sent from the instruction decoder 51 is not applied to the select terminal S of the selector 54. Accordingly, the data from the operation unit 57 is transferred to the second register file 53 through this selector 54.

The selector 55 selects any one of the data from the first register file 52 and the data from the second register file 53 in response to a control signal from the bank switching control circuit 56, and sends the selected data to the operation unit 57. The bank switching control circuit 56 generates the control signal to select the input terminal B of the selector 55 if receiving the signal CALL from the instruction decoder 51 and to select the input terminal A of the selector 55 if receiving the signal RET. Thus, the data from the first register file 52 is sent to the operation unit 57 during the execution of the main routine, and the data from the second register file 53 is sent to the operation unit 57 during the execution of the sub routine.

The operation unit 57 processes the data from the selector 55, in accordance with the operation signal OP from the instruction decoder 51. This processed result is stored in the register specified by the write address WRA, within the first register file 52, during the execution of the main routine, and is stored in the register specified by the write address WRA, within the second register file 53, during the execution of the sub routine.

In this information processor according to the first conventional technique, the register transfer instruction is executed immediately before the execution of the call instruction in the main routine so that the content of the first register file is copied to the second register file. As a result, the continuity between the process of the main routine and the process of the sub routine is retained.

In a second conventional technique for the bank switching operation, such a method is employed that when the sub routine is called from the main routine, a parameter is not transferred directly from the first register file to the second register file, and is transferred through the main memory. That is, in the main routine, prior to the call of the sub routine, the parameter to be set in the second register file is stored in a predetermined area of the main memory. On the other hand, in the sub routine, prior to the execution of the instruction in the sub routine, the parameter stored in the predetermined area of the main memory is loaded to the second register file. In this second conventional technique, a common register that can be accessed from both the main routine and the sub routine may be used instead of the main memory.

An information processor according to this second conventional technique does not require the data transfer path from the first register file 52 through the selector 54 to the second register file 53 shown in FIG. 1. This results in the configuration simpler than that of the information processor according to the first conventional technique.

Moreover, a third conventional technique for the bank switching operation is a technique referred to as a so-called register window. In this third conventional technique, as shown in FIG. 2, a register file is divided into a main routine area, a sub routine area and a common area. In this case, physical addresses 0 to 47 are given to the register file.

In this configuration, logical addresses 0 to 31 for main routine are used when the register file is accessed from the main routine. In this case, the logical addresses 0 to 15 are correlated to the physical addresses 16 to 31 and the logical addresses 16 to 31 are correlated to the physical addresses 0 to 16. Similarly, logical addresses 0 to 31 for sub routine are used when the register file is accessed from the sub routine. In this case, the logical addresses 0 to 15 are correlated to the physical addresses 16 to 31 and the logical addresses 16 to 31 are correlated to the physical addresses 32 to 47. Those correlations are established when the respective programs of the main routine and the sub routine are complied.

In this information processor, in the main routine, a common area specified by the logical addresses 0 to 15 for main routine is used as an exchange area of a parameter, and a main routine area specified by the logical addresses 16 to 31 is used as a work area. On the other hand, in the sub routine, a common area specified by the logical addresses 0 to 15 for sub routine is used as an exchange area of a parameter, and a sub routine area specified by the logical addresses 16 to 31 is used as a work area. In this case, the common area of the main routine is physically equal to the common area of the sub routine. Thus, in the main routine, it is not necessary to transfer the parameter to the register file for the sub routine when the sub routine is called. As a result, an overhead associated with the switching of the register bank can be reduced.

As an information processor related to this third conventional technique, Japanese Laid Open Patent Application (JP-A-Heisei 7-64857) discloses "data storage apparatus". In this third conventional technique, a first register file having a window configuration comprises a register having a read port and a write port. Then, a data access is performed between the first register file and a second register file corresponding to one window. In this data processor, a selected portion of the first register file is re-written to the second register file, in accordance with a value of a window pointer. This rewriting operation is performed when the value of the window pointer is changed. An access from an operating device to the register is treated as an access to the second register file. A register constituting the second register file has a read port and a write port for a data access to the first register file, in addition to the read ports and the write ports in which the number thereof correspond to the number of the operating devices. In this way, the size of the circuit in the entire register files is reduced by equipping the second register file between the operating device and the first register file having the window configuration.

However, in the information processor according to the first conventional technique, the data is actually transferred from the first register file to the second register file. Thus, a long time is required to carry out the bank switching operation. Actually, it usually takes one clock to transfer one data between the registers. If the number of registers is 32, 32 clocks are required to transfer all the data.

In this first conventional technique, all the data or the necessary data must be transferred prior to the execution of the sub routine. Thus, as the number of registers to be transferred is larger, the overhead of the data transfer associated with the switching of the register bank is larger. Moreover, since a function executed in the sub routine is simple, the operation time is less than 32 clocks, in many cases. In such a case, since a wait time in the operation unit 57 becomes longer, usage efficiency does not improve. Especially, a drop in a process performance of the information processor caused by the overhead of the data transfer brings about a problem in a real time process.

The information processor according to the second conventional technique exchanges the data between the main routine and sub routine through the main memory or the common register. Thus, it takes a long time to carry out this exchanging process, which brings about a drop in an effective process performance. Especially, when the data stored in the first register file is written to the second register file through a main memory having a slow access speed, it takes a long time to carry out the bank switching operation. Also, the information processor according to the first and second conventional techniques, if it is the information processor that can process a plurality of routines in parallel, needs to exclusively process the data between the routines. Hence, the overhead is further larger to thereby drop the process performance.

Moreover, the information processor according to the third conventional technique can quickly carry out the bank switching operation since it is not necessary to actually transfer the data from the first register file to the second register file. However, this third conventional technique has such a problem that the register can not be effectively used since the common area is fixed in hardware. For example, if a certain software sufficiently functions by using a few parameters when the sub routine is called while another software requires many parameters, there may be a situation that a non-used register is induced or that the number of registers is short because the size of the common area is fixed.

Also, the necessary data must be stored in advance in the common area in order to execute the sub routine without the data transfer. This reason is as follows. That is, in the sub routine, the data can not be directly read out from the area in the main routine, and in the main routine, the data can not be directly written to the area in the sub routine. Thus, it must be programmed or compiled such that the data to be commonly used in the main routine and the sub routine is selected and stored in the common area. Hence, a load on the software becomes heavy to thereby make the generality insufficient.

SUMMARY OF THE INVENTION

The present invention is accomplished in view of the above mentioned problems. Therefore, an object of the present invention is to provide an information processor which can quickly switch register files without influence of the number of parameters to be exchanged, and a method for switching the register files.

To achieve the above-described object, an information processor, according to a first aspect of the present invention, is featured by such an information processor including a first register file, a second register file, a controller, a first path, a second path and a third path. The first register is used when a first instruction is executed and the second register file is used when a second instruction is executed. The controller activates the second register file and deactivates the first register file, when the second instruction is called from the first instruction. The first path transfers a data read from the first register file if the data used by the second instruction is not written in the second register file which is activated by the controller when the second instruction is executed. The second path transfers the data read from the second register file if the data used by the second instruction is written in the second register file which is activated by the controller when the second instruction is executed. Also, the third path transfers an execution result obtained by executing the second instruction based on the data transferred from one of the first path and the second path to write into the second register file.

In this information processor, when a second instruction is called from a first instruction, a state in which a first register file is used is switched to another state in which a second register file is used. Then, when the second instruction is executed, if a data used by the second instruction is not still written into the second register file, the data obtained from the first register file is used to execute the second instruction and then an execution result is written into the second register file. Thus, it is not necessary to previously transfer the data used by the second instruction from the first register file to the second register file. Hence, an overhead can be suppressed when the register files are switched. Also, differently from the common area of the fixed size in the conventional register window, this is equivalent to a case in which only a register for storing therein the data used in the second instruction is used as the common area. Therefore, there is neither the occurrence of a non-used register nor the occurrence of lack of registers.

Also, to similarly achieve the above-explained object, an information processor, according to a second aspect of the present invention, is featured by such an information processor including a plurality of register files, a controller, a first path, a second path and a third path. The plurality of register files is used when a plurality of instructions is executed, respectively. The controller, when an instruction is called from another instruction, activates one of the plurality of register files corresponding to the instruction and deactivates remaining ones of the plurality of register files corresponding to the other instruction. The first path transfers a data read from one of the remaining register files if the data used by the instruction is not written in the one register file activated by the controller when the instruction is executed. The second path transfers the data read from the one register file if the data used by the instruction is written in the one register file activated by the controller when the instruction is executed. Also, the third path transfers an execution result obtained by executing the instruction based on the data transferred from one of the first path and the second path to write into the activated one register file.

This information processor can switch three or more register files by using little overhead to thereby enable a fast data process.

Also, to similarly achieve the above explained object, a register file switching method, according to a third aspect of the present invention, is featured by such a register file switching method including steps (a) to (d).

This register file switching method is applied in an information processor having a first register file used when a first instruction is executed and a second register file used when a second instruction is executed.

In the step (a), the second register file is activated and the first register file is deactivated, when the second instruction is called from the first instruction. In the step (b), a data read from the first register file is transferred if the data used by the second instruction is not written in the second register file which is activated at the step (a) when the second instruction is executed. In the step (c), the data read from the second register file is transferred if the data used by the second instruction is written in the second register file which is activated at the step (a) when the second instruction is executed. Also, in the step (d), an execution result obtained by executing the second instruction based on the data obtained at the step (b) and the step (c) is transferred to write into the second register file.

Also, to similarly achieve the above explained object, a register file switching method, according to a fourth aspect of the present invention, is featured by such a register file switching method including steps (a) to (d).

This register file switching method is applied in an information processor having a plurality of register files that are used when a plurality of instructions is executed respectively.

In the step (a), when an instruction is called from another instruction, one of the plurality of register files corresponding to the instruction is activated and remaining ones of the plurality of register files corresponding to the other instruction is deactivated. In the step (b), a data read from one of the remaining register files is transferred if the data used by the instruction is not written in the one register file activated at the step (a) when the instruction is executed. In the step (c), the data read from the one register file is transferred if the data used by the instruction is written in the one register file activated at the step (a) when the instruction is executed. Also, in the step (d), an execution result obtained by executing the instruction based on the data obtained at one of the step (b) and the step (c) is transferred to write into the activated one register file.

Moreover, to similarly achieve the above-explained object, an information processor, according to a fifth aspect of the present invention, is featured by such an information processor including a first register file, a second register file, a controller and an executing section. The first register file is used when a first instruction is executed. The second register file is used when a second instruction is executed. The controller activates the second register file and deactivates the first register file, when the second instruction is called from the first instruction. Also, the executing section receives a data transferred from the first register file if the data used by the second instruction is not written in the second register file activated by the controller when the second instruction is executed, the data transferred from the second register file if the data used by the second instruction is written in the second register file activated by the controller when the second instruction is executed, executes the second instruction based on the received data, and writes an execution result obtained by executing the second instruction into the second register file.

DESCRIPTION OF THE PREFERRED EMBODIMENTS

Now, embodiments of the present invention will be described below with reference to the attached drawings. In this information processor, it is supposed that a two-operand type instruction set is used and that a register and an immediate value are used as the respective operands. Thus, the instruction used in this information processor basically operate such that a content of a register specified as a first operand or an immediate value and a content of a register specified as a second operand are operated to then store the operated result in the register specified as the second operand.

First Embodiment

Figure 1:
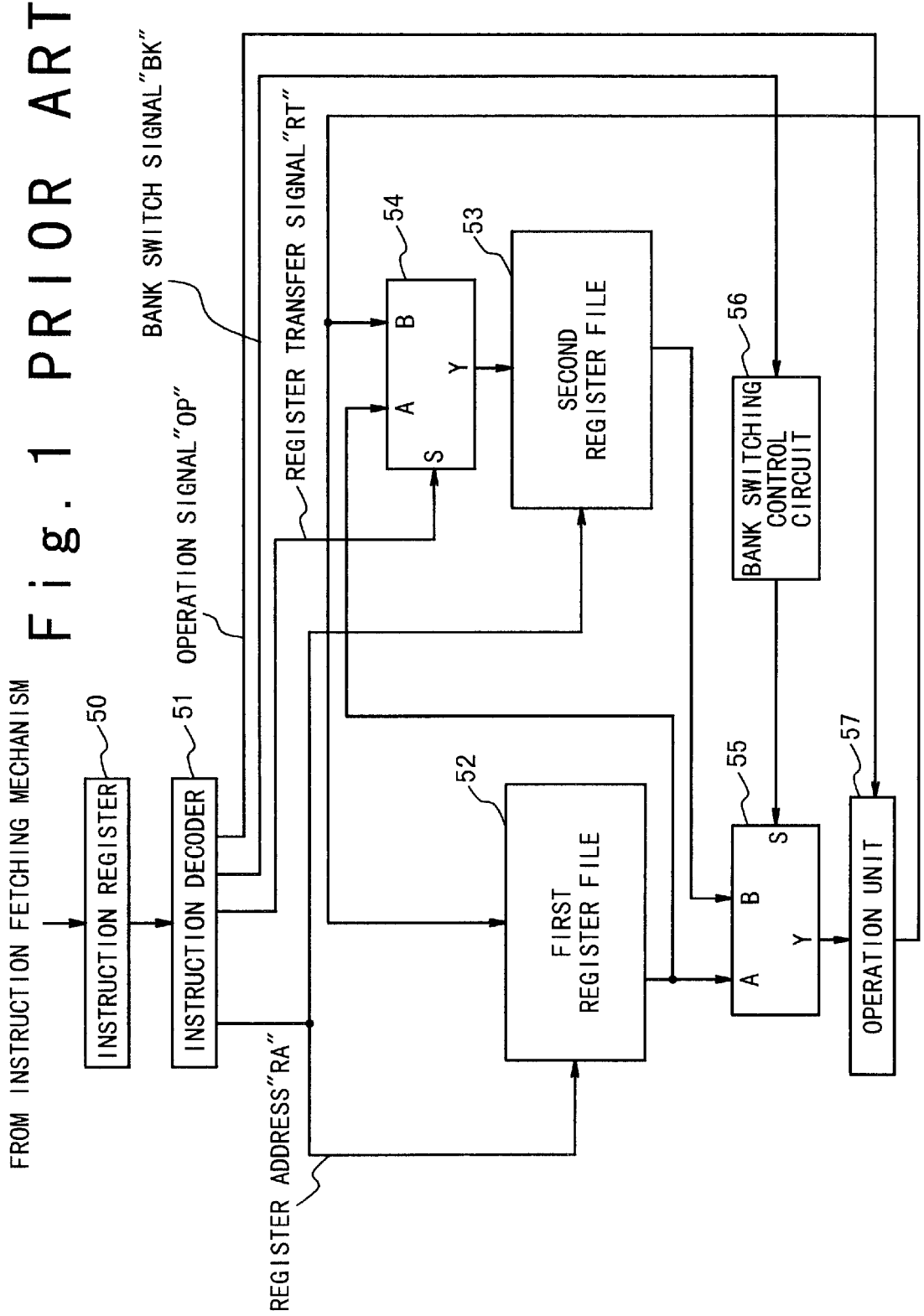
FIG. 1 is a block diagram showing a configuration of a conventional information processor.
Figure 2:
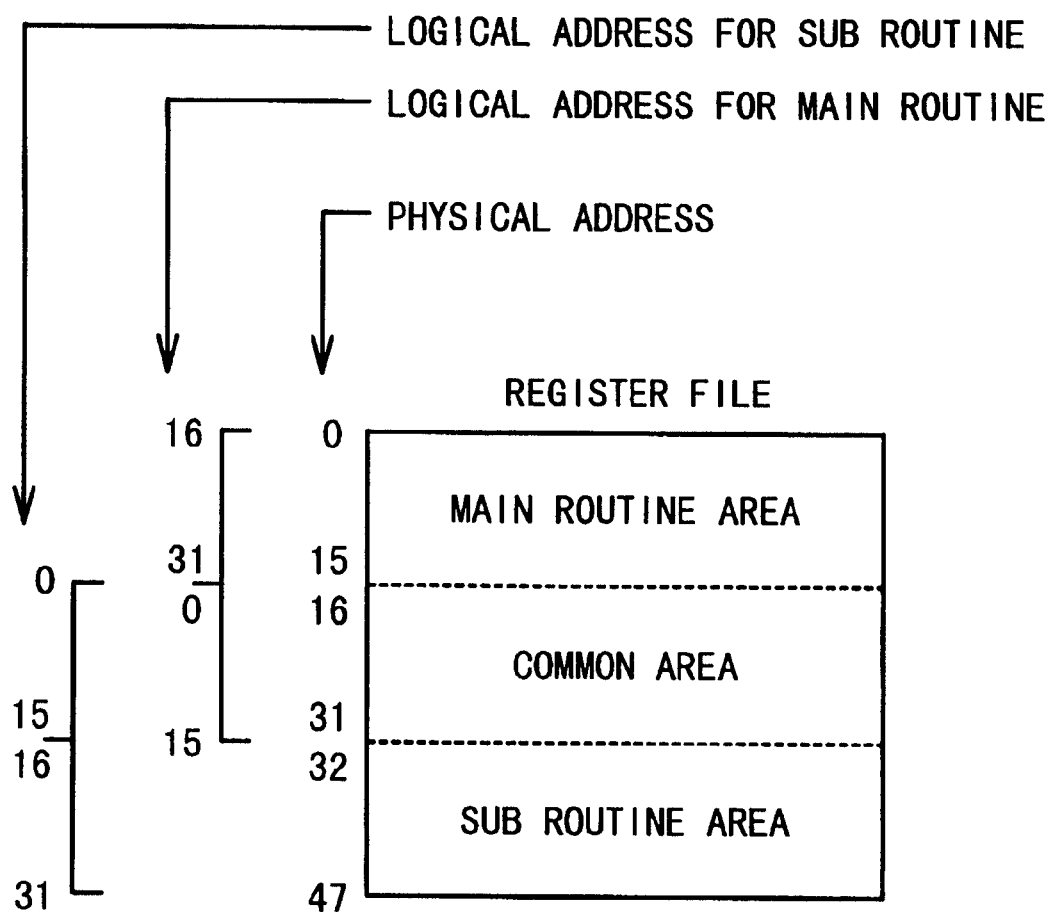
FIG. 2 is an explanatory diagram explaining a conventional register window technique.
Figure 3:
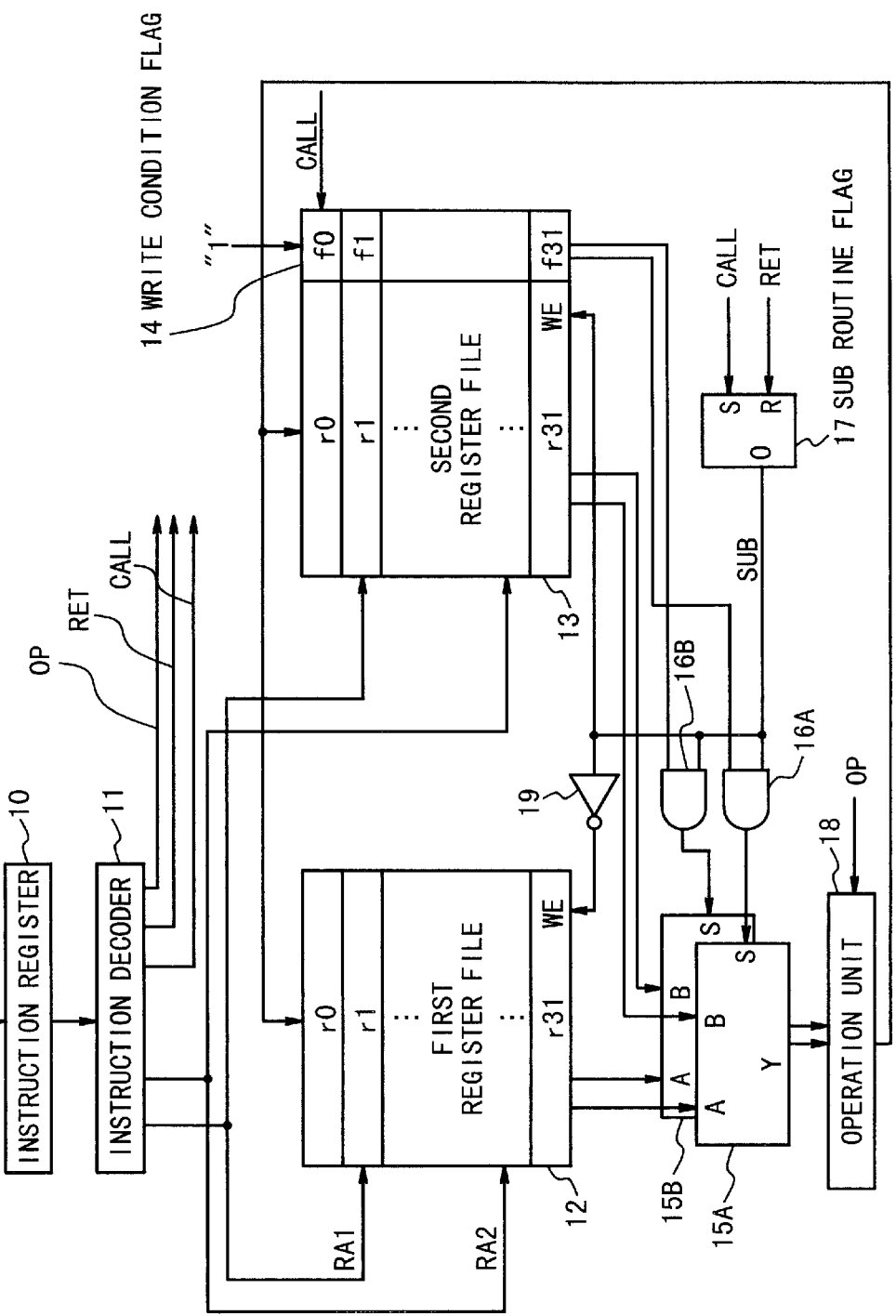
FIG. 3 is a block diagram showing a configuration of a main portion of an information processor according to a first embodiment of the present invention.

FIG. 3 is a block diagram showing the configuration of the main portion in the information processor according to a first embodiment of the present invention. This information processor comprises an instruction register 10, an instruction decoder 11, a first register file 12, a second register file 13, an write condition flag 14, selectors 15A, 15B, AND gates 16A, 16B, a sub routine flag 17, an operation unit 18 and an inverter 19.

The instruction register 10 temporarily stores therein an instruction read out from a main memory by using an instruction fetching mechanism (not shown). A content of this instruction register 10 is sent to the instruction decoder 11.

The instruction decoder 51 extracts a first operand designation section of an instruction stored in the instruction register 10, and sends as a first register address RA1 to the first register file 12 and the second register file 13. Also, the instruction decoder 11 extracts a second operand designation section of the instruction stored in the instruction register 10, and sends as a second register address RA2 to the first register file 12 and the second register file 13. It should be noted that a path of the immediate value is omitted in FIG. 3. However, if the first operand designation section of the instruction is defined as an immediate value, the immediate value is sent to an input terminal A of the selector 15A in its original state. Similarly, if the second operand designation section of the instruction is defined as an immediate value, the immediate value is sent to an input terminal A of the selector 15B in its original state.

Moreover, the instruction decoder 51 decodes an operation code section of the instruction stored in the instruction register 10, and then generates a signal representative of each instruction. For example, if a call instruction is stored in the instruction register 10, the instruction decoder 11 generates a signal CALL representative of the call instruction, and sends to the sub routine flag 17. If a return instruction is stored in the instruction register 10, the instruction decoder 11 generates a signal RET representative of the return instruction, and sends to the sub routine flag 17. If instructions except the above-mentioned instructions such as a arithmetic operation instruction, a logical operation instruction, a comparison instruction, a movement instruction, a branch instruction and the like, are stored in the instruction register 10, the instruction decoder 11 generates an operation signal OP representative of each instructions, and sends to the operation unit 18.

The first register file 12 is composed of 32 registers r0 to r31, and it is used when a main routine constituted by a first instruction string is executed. Each register is composed of a dual port RAM. The content of the register specified by the first register address RA1 is read out from a first output port of this first register file 12, and sent to the input terminal A of the selector 15A. Similarly, the content of the register specified by the second register address RA2 is read out from a second output port of this first register file 12, and sent to the input terminal A of the selector 15B. Also, the first register file 12 is set to a write enable state, if a signal SUB outputted from the sub routine flag 17 is at a state "0", namely, if the main routine is executed. Then, when an instruction involving a write operation is executed, a data outputted from the operation unit 18 is written to the register specified by the second register address RA2.

The second register file 13 is composed of 32 registers r0 to r31, and it is used when a sub routine constituted by a second instruction string is executed. Each register is composed of a dual port RAM. The content of the register specified by the first register address RA1 is read out from a first output port of this second register file 13, and sent to the input terminal B of the selector 15A. Also, the content of the register specified by the second register address RA2 is read out from a second output port of this second register file 13, and sent to the input terminal B of the selector 15B. Also, the second register file 13 is set to a write enable state, if the signal SUB outputted from the sub routine flag 17 is at a state "1", namely, if the sub routine is executed. Then, when the instruction involving the write operation is executed, the data outputted from the operation unit 18 is written to the register specified by the second register address RA2.

The write condition flag 14 is composed of 32 flags f0 to f31. The 32 flags f0 to f31 correspond to the 32 registers r0 to r31, respectively. This write condition flag 14 can be constituted by a dual port RAM of one bit. It should be noted that this write condition flag 14 is not limited to the dual port RAM. So, it may be constituted by a register, a flip-flop or the like.

A flag specified by the first register address RA1 is read out from a first output port of this write condition flag 14, and sent to the AND gate 16A. Similarly, a flag specified by the second register address RA2 is read out from a second output port of this write condition flag 14, and sent to the AND gate 16B. Also, the flag specified by the second register address RA2 in the write condition flag 14 is set to "1", if the instruction involving the write operation is executed in the condition that the signal SUB outputted from the sub routine flag 17 is at the state "1", namely, in the condition that the sub routine is executed. Moreover, all the flags constituting the write condition flag 14 are all cleared to "0" when the call instruction is executed in the main routine, namely, when the signal CALL from the instruction decoder 11 is set to "1".

The selector 15A selects any one of the data outputted from the first output port of the first register file 12 and the data outputted from the first output port of the second register file 13, in accordance with a selection signal supplied from the AND gate 16A, and then sends the selected data as the data of the first operand to the operation unit 18. Similarly, the selector 15B selects any one of the data outputted from the second output port of the first register file 12 and the data outputted from the second output port of the second register file 13, in accordance with a selection signal supplied from the AND gate 16B, and then sends the selected data as the data of the second operand to the operation unit 18.

The sub routine flag 17 stores therein a state as to whether or not the sub routine is being executed. This sub routine flag 17 is cleared to "0" during the execution of the main routine, and set to "1" during the execution of the sub routine. This sub routine flag 17 is set to "1" when the signal CALL from the instruction decoder 11 becomes at "1" since the call instruction is set in the instruction register 10, and is cleared to "0" when the signal RET from the instruction decoder 11 becomes at "1" since the return instruction is set in the instruction register 10. A signal SUB outputted from the sub routine flag 17 is sent to the AND gates 16A, 16B and the inverter 19.

The AND gate 16A carries out the logical AND operation between the signal outputted from the first output port of the write condition flag 14 and the signal SUB outputted from the sub routine flag 17, and then sends the result to a select terminal S of the selector 15A. When the main routine is being executed, the AND gate 16A outputs "0" since the signal SUB from the sub routine flag 17 is at "0". Accordingly, the input terminal A of the selector 15A is selected. Thus, during the execution of the main routine, the data from the first output port of the first register file 12 is sent to the operation unit 18 as the data of the first operand.

On the other hand, the signal SUB from the sub routine flag 17 is at "1" during the execution of the sub routine. Thus, the output of the AND gate 16A is determined by the signal outputted from the first output port of the write condition flag 14. That is, if the signal outputted from the first output port of the write condition flag 14 is at "0" (a non-written state), the AND gate 16A outputs "0". Accordingly, the input terminal A of the selector 15A is selected. Hence, the data outputted from the first output port of the first register file 12 is sent to the operation unit 18 as the data of the first operand. On the other hand, if the signal from the first output port of the write condition flag 14 is at "1" (an already-written state), the AND gate 16A outputs "1". Accordingly, the input terminal B of the selector 15A is selected. Hence, the data outputted from the first output port of the second register file 13 is sent to the operation unit 18 as the data of the first operand.

Similarly, the AND gate 16B carries out the logical AND operation between the signal outputted from the second output port of the write condition flag 14 and the signal outputted from the sub routine flag 17, and then sends the result to a select terminal S of the selector 15B. When the main routine is being executed, the AND gate 16B outputs "0" since the signal SUB from the sub routine flag 17 is at "0". Accordingly, the input terminal A of the selector 15B is selected. Thus, during the execution of the main routine, the data outputted from the second output port of the first register file 12 is sent to the operation unit 18 as the data of the second operand.

On the other hand, the signal SUB outputted from the sub routine flag 17 is at "1" during the execution of the sub routine. Thus, the output of the AND gate 16B is determined by the signal outputted from the second output port of the write condition flag 14. That is, if the signal outputted from the second output port of the write condition flag 14 is at "0" (the non-written state), the AND gate 16A outputs "0". Accordingly, the input terminal A of the selector 15B is selected. Hence, the data from the second output port of the first register file 12 is sent to the operation unit 18 as the data of the second operand. On the other hand, if the signal outputted from the second output port of the write condition flag 14 is at "1" (the already-written state), the AND gate 16B outputs "1". Accordingly, the input terminal B of the selector 15B is selected. Hence, the data from the second output port of the second register file 13 is sent to the operation unit 18 as the data of the second operand.

The operation unit 18 executes an operation between the data of the first operand from the selector 15A and the data of the second operand from the selector 15B, in accordance with the operation signal OP from the instruction decoder 11, and then stores the operated result in the first register file 12 or the second register file 13. Whether the operated result is stored in the first register file 12 or the second register file 13 is determined by the signal SUB outputted by the sub routine flag 17.

The inverter 19 inverts the signal SUB from the sub routine flag 17, and sends to a write enable terminal WE of the first register file 12. Also, the signal SUB from the sub routine flag 17 is sent to a write enable terminal WE of the second register file 13 in its original state. Accordingly, the first register file 12 is set to the write enable state during the execution of the main routine, and the second register file 13 is set to the write enable state during the execution of the sub routine.

Now, the operation of the information processor having the above-mentioned configuration will be described below with an execution of a program shown in FIG. 4 as an example. It is supposed that at an initial state, the sub routine flag 17 is set to "0" and the contents of the write condition flag 14 are all set to "0".

Figure 4:
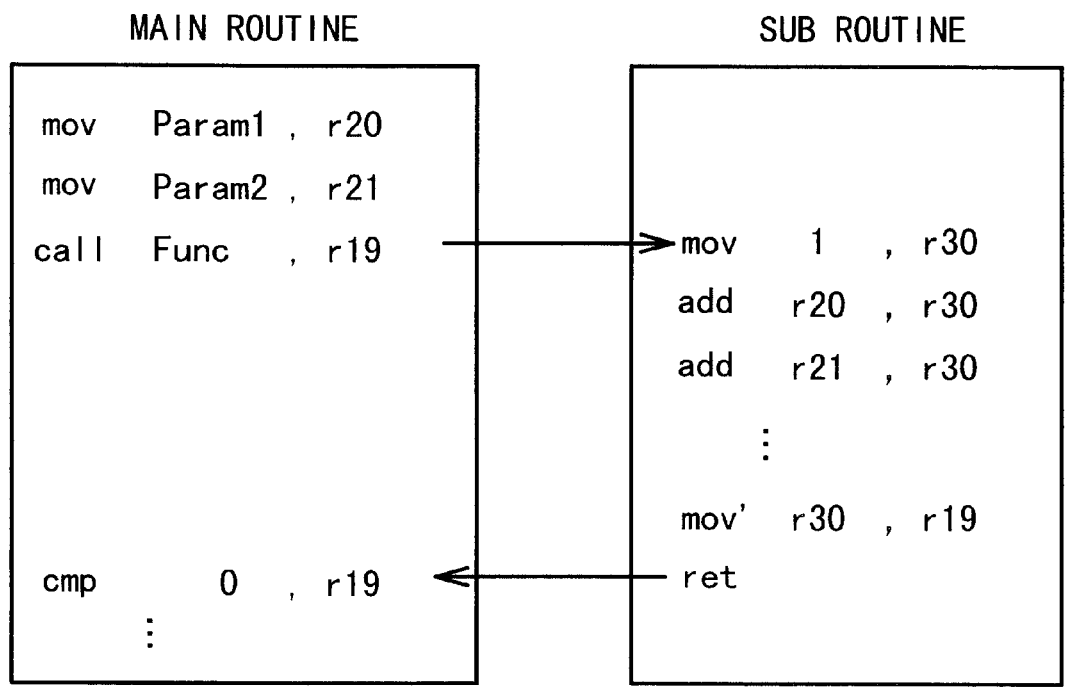
FIG. 4 is a view showing a program example to describe an operation of the information processor according to the first embodiment of the present invention.

A main routine shown in FIG. 4 is a program in which at a move instruction "mov Param1, r20", a parameter Param1 is set in the register r20 and at a move instruction "mov Param2, r21", a parameter Param2 is set in the register r21, and at a call instruction "call Func, r19", the register r19 is specified as a function return value register to then call a sub routine specified by the Func, and after a return from the sub routine is occurred, at a compare instruction "cmp 0, r19", a content of the register r19 is compared with "0".

A sub routine shown in FIG. 4 is a program in which at a move instruction "mov 1, r30", a content of the register r30 is set to "1", and at an add instruction "add r20, r30", a content of the register r20 is added to a content of the register r30, and at an add instruction "add r21, r30", a content of the register 21 is added to a content of the register r30, and then, various instructions are executed, and at a special move instruction "mov' r30, r19", the content of the register r30 is moved to the register r19, and then, in accordance with a return instruction, the operational flow returns back to the main routine. In the sub routine program, the special move instruction "mov' r30, r19" has a function for moving the content of the register r30 in the second register file 13 to the register r19 in the first register file 12.

In this information processor, the instruction fetching mechanism (not shown) fetches a move instruction "mov Param1, r20" from a main memory (not shown), and stores in the instruction register 10. The instruction decoder 11 sends a parameter Param1 of the first operand designation section of the instruction stored in the instruction register 10 to the input terminal A of the selector 15A in its original state.

Also, the instruction decoder 11 decodes the second operand designation section of the instruction stored in the instruction register 10, and generates a second register address RA2 specifying the register r20. This second register address RA2 is sent to the first register file 12, the second register file 13 and the write condition flag 14. Accordingly, the content of the register r20 within the first register file 12 is read out from the second output port thereof, and sent to the input terminal A of the selector 15B. Similarly, the content of the register r20 within the second register file 13 is read out from the second output port thereof, and sent to the input terminal B of the selector 15B. Moreover, the flag f20 in the write condition flag 14 is read out from the second output port thereof, and sent to the AND gate 16B.

Also, the instruction decoder 11 decodes the operation code section of the instruction stored in the instruction register 10, and generates an operation signal OP representative of a move instruction, and sends to the operation unit 18. In this case, the instruction stored in the instruction register 10 is not the call instruction nor the return instruction. Accordingly, since the signal CALL and the signal RET are not generated, the sub routine flag 17 is still at "0". Hence, both the AND gates 16A, 16B output "0". As a result, the respective input terminals A of the selectors 15A, 15B are selected. Then, the parameter Param1 as the data of the first operand and the content of the register r20 in the first register file 12 as the data of the second operand are respectively sent to the operation unit 18 in their original states.

The operation unit 18, since the operation signal OP representative of the move instruction is supplied from the instruction decoder 11, ignores the data of the second operand, and passes the data of the first operand, namely, the parameter Param1. The parameter Param1 outputted from the operation unit 18 is sent to the respective input terminals of the first register file 12 and the second register file 13. Here, the sub routine flag 17 is at "0". Thus, "1" is sent to the write enable terminal WE of the first register file 12, and "0" is sent to the write enable terminal WE of the second register file 13, respectively. Hence, the parameter Param1 outputted from the operation unit 18 is written to the register r20 specified by the second register address RA2, within the first register file 12. The execution of the move instruction "mov Param1, r20" is completed through the above-mentioned operations.

A next move instruction "mov Param2, r21" is executed similar to the above-mentioned move instruction. Then, the instruction fetching mechanism reads out the call instruction "call Func, r19" from the main memory. The read call instruction "call Func, r19" is stored in the instruction register 10. The instruction decoder 11 decodes the second operand designation section of the instruction stored in the instruction register 10, and thereby generates a second register address RA2 specifying the register r19. This second register address RA2 is stored in a data saving register (not shown). A content of the data saving register is referred when the special move instruction "mov' r30, r19" is executed (detailed later). An instruction address of the compare instruction "cmp 0, r19" next to the call instruction "call Func, r19" is stored in an address saving register. The content of the address saving register is used in the return instruction (detailed later). It should be noted that the second register address RA2 is sent to the first register file 12, the second register file 13 and the write condition flag 14. However, the second register address RA2 has no relation to the execution of the call instruction.

The instruction decoder 11 decodes the operation code section of the instruction stored in the instruction register 10, and thereby generates the signal CALL representative of the call instruction, and then sends to the sub routine flag 17 and the write condition flag 14. Thus, the sub routine flag 17 is set to "1".

It should be noted that since the call instruction has no function to write the data to the register r19, the flag f19 in the write condition flag 14 is not changed. Also, the operation unit 18 does not operate since the instruction decoder 11 generates the signal CALL, but does not generate the operation signal OP. Moreover, when the signal CALL is generated, an instruction address corresponding to a function code Func, namely, a top address of the sub routine is set in an instruction counter (not shown). The execution of the call instruction "call Func, r19" is completed through the above-mentioned operations. Then, the execution of the sub routine is started from a next instruction cycle.

When the execution of the sub routine is started, the instruction fetching mechanism reads out a move instruction "mov 1, r30" from the main memory, and stores in the instruction register 10. The instruction decoder 11 sends the immediate value "1" in the first operand designation section of the instruction stored in the instruction register 10, to the input terminal A of the selector 15A in its original state.

Also, the instruction decoder 11 decodes the second operand designation section of the instruction stored in the instruction register 10, and generates a second register address RA2 specifying the register r30. This second register address RA2 is sent to the first register file 12, the second register file 13 and the write condition flag 14. Accordingly, the content of the register r30 in the first register file 12 is read out from the second output port thereof, and is sent to the input terminal A of the selector 15B. Similarly, the content of the register r30 in the second register file 13 is read out from the second output port thereof, and is sent to the input terminal B of the selector 15B. Moreover, the flag f30 in the write condition flag 14 is read out from the second output port thereof, and is sent to the AND gate 16B.

Also, the instruction decoder 11 decodes the operation code section of the instruction stored in the instruction register 10, and generates the operation signal OP representative of the move instruction, and sends to the operation unit 18. In this case, the instruction stored in the instruction register 10 is neither the call instruction nor the return instruction. Thus, the sub routine flag 17 is still at "1". Also, since the writing operation to the second register file 13 is not still executed, all the flags in the write condition flag 14 are still cleared to "0". Hence, both the AND gates 16A, 16B output "0". As a result, the respective input terminals A of the selectors 15A, 15B are selected. Then, the immediate value "1" as the data of the first operand and the content of the register r30 in the first register file 12 as the data of the second operand are respectively sent to the operation unit 18.

The operation unit 18, since the operation signal OP representative of the move instruction is supplied from the instruction decoder 11, ignores the data of the second operand, and passes the data of the first operand, namely, the immediate value "1". This value "1" outputted from the operation unit 18 is sent to the respective input terminals of the first register file 12 and the second register file 13. Here, the sub routine flag 17 is at "1". Thus, "0" is sent to the write enable terminal WE of the first register file 12, and "1" is sent to the write enable terminal WE of the second register file 13, respectively. Hence, the value "1" outputted from the operation unit 18 is written to the register r30 specified by the second register address RA2, within the second register file 13. Simultaneously, "1" is written to the flag f30 specified by the second register address RA2, within the write condition flag 14. The execution of this move instruction "mov 1, r30" is completed through the above-mentioned operations.

Next, the instruction fetching mechanism reads out the add instruction "add r20, r30" from the main memory, and stores in the instruction register 10. The instruction decoder 11 decodes the first operand designation section of the instruction stored in the instruction register 10, and thereby generates the first register address RA1 specifying the register r20, and then sends to the first register file 12, the second register file 13 and the write condition flag 14. Accordingly, the content of the register r20 is read out from the first output port of the first register file 12, and sent to the input terminal A of the selector 15A. Similarly, the content of the register r20 is read out from the first output port of the second register file 13, and sent to the input terminal B of the selector 15A. Also, the flag f20 is read out from the first output port of the write condition flag 14, and sent to the AND gate 16A.

Similarly, the instruction decoder 11 decodes the second operand designation section of the instruction stored in the instruction register 10, and thereby generates the second register address RA2 specifying the register r30, and then sends to the first register file 12, the second register file 13 and the write condition flag 14. Accordingly, the content of the register r30 is read out from the second output port of the first register file 12, and sent to the input terminal A of the selector 15B. Similarly, the content of the register r30 is read out from the second output port of the second register file 13, and sent to the input terminal B of the selector 15B. Also, the flag f30 is read out from the second output port of the write condition flag 14, and sent to the AND gate 16B.

Here, the sub routine flag 17 is at "1", and "0" as the flag f20 is read out from the first output port of the write condition flag 14. Thus, the AND gate 16A outputs "0". Accordingly, since the input terminal A of the selector 15A is selected, the data from the first output port of the first register file 12, namely, the content of the register r20 in the first register file 12 is sent to the operation unit 18 as the data of the first operand. Also, "1" as the flag f30 is read out from the second output port of the write condition flag 14. Hence, the AND gate 16B outputs "1". Accordingly, since the input terminal B of the selector 15B is selected, the data from the second output port of the second register file 13, namely, the content of the register r30 in the second register file 13 is sent to the operation unit 18 as the data of the second operand.

The operation unit 18 adds the data from the selector 15A to the data from the selector 15B, and sends the operated result to the respective input terminals of the first register file 12 and the second register file 13. At this time, since the sub routine flag 17 is at "1", "0" is sent to the write enable terminal WE of the first register file 12, and "1" is sent to the write enable terminal WE of the second register file 13. Thus, the operated result is written to the register r30 specified by the second register address RA2, within the second register file 13. Through the above-mentioned operations, the content of the register r20 in the first register file 12 and the content of the register r30 in the second register file 13 are added, and the operated result is stored in the register r30 in the second register file 13. Then, the execution of the add instruction "add r20, r30" is completed.

A next add instruction "add r21, r30" is also executed under the operation similar to that of the add instruction "add r20, r30". That is, the content of the register r21 in the first register file 12 is added to the content of the register r30 in the second register file 13, and the result is stored in the register r30 in the second register file 13. Then, the execution of the add instruction "add r21, r30" is completed.

Next, the special move instruction "mov' r30, r19" is executed after the execution of several instructions. It should be noted that in the execution of the several instructions, it is treated so as to use the register r19 as the second operand of the special move instruction, in accordance with the content of the data saving register. This special move instruction "mov' r30, r19" is equal to the move instruction except that the register is specified instead of the immediate value is specified in the first operand designation section and further the register r19 specified by the second operand designation section is forced to be the register r19 in the first register file 12. Due to this execution of the special move instruction, the data stored in the register r30 in the second register file 13 as the function return value is moved to the register r19 in the first register file 12.

Next, the instruction fetching mechanism reads out the return instruction from the main memory, and stores in the instruction register 10. The instruction decoder 11 decodes the operation code section of the instruction stored in the instruction register 10, and thereby generates the signal RET representative of the return instruction, and then sends to the sub routine flag 17. Accordingly, the sub routine flag 17 is cleared to "0". Thus, the first register file 12 is used from a next instruction cycle.

Also, when the signal RET is generated, the content of the address saving register, namely, an instruction address of the compare instruction "cmp 0, r19" is set in an instruction counter (not shown). It should be noted that the operation unit 18 is not operated since the instruction decoder 11 generates the signal RET, but does not generate the operation signal OP. The above-mentioned operations enable the execution of the return instruction to be completed. Thereafter, the execution of the main routine is resumed from a next instruction cycle.

When the execution of the main routine is resumed, the instruction fetching mechanism reads out the compare instruction "cmp 0, r19" from the main memory, and stores in the instruction register 10. The instruction decoder 11 sends the immediate value "0" in the first operand designation section of the instruction stored in the instruction register 10 to the input terminal A of the selector 15A in its original state.

The instruction decoder 11 decodes the second operand designation section of the instruction stored in the instruction register 10, and generates the second register address RA2 specifying the register r19. This second register address RA2 is sent to the first register file 12, the second register file 13 and the write condition flag 14. Accordingly, the content of the register r19 in the first register file 12 is read out from the second output port thereof, and is sent to the input terminal A of the selector 15B. Similarly, the content of the register r19 in the second register file 13 is read out from the second output port thereof, and is sent to the input terminal B of the selector 15B. Moreover, the flag f19 in the write condition flag 14 is read out from the second output port thereof, and is sent to the AND gate 16B.

Also, the instruction decoder 11 decodes the operation code section of the instruction stored in the instruction register 10, and generates an operation signal OP representative of the compare instruction, and supplies to the operation unit 18. In this case, the instruction stored in the instruction register 10 is not the call instruction nor the return instruction. Thus, the sub routine flag 17 is still at "0". Hence, both of the AND gates 16A, 16B output "0". As a result, the respective input terminals A of the selectors 15A, 15B are selected. Then, the immediate value "0" as the data of the first operand and the content of the register r19 of the first register file 12 as the data of the second operand are respectively sent to the operation unit 18.

The operation unit 18, since the operation signal OP representative of the compare instruction is supplied from the instruction decoder 11, compares the data of the first operand, namely, the value "0" with the data of the second operand, namely, the content of the register r19. In this compare instruction "cmp 0, r19", the operated result is not stored in the first register file 12 and the second register file 13. The compared result is merely set in a status register (not shown). Hereafter, the instructions in the main routine are executed sequentially.

As described above, according to this first embodiment of the present invention, when the sub routine is called, it is not necessary to transfer the parameter stored in the first register file 12 to the second register file 13. Thus, the register files can be quickly switched. Also, in the sub routine, if a register in the second register file 13 is not still written, a register in the first register file 12 corresponding to the register in the second register file 13 is accessed. On the other hand, if a register in the second register file 13 is already written, the register is accessed. This operation is equivalent to an operation for switching arbitrary number of registers from the first register file to the second register file. Hence, it is possible to avoid the situation that the non-used register is induced or that the number of registers is short, depending on the application, since the size of the common area is fixed as described in the conventional register window technique.

In the third conventional technique, the area for the main routine can not be used in the sub routine. Thus, the number of necessary parameters may become large to thereby cause the common area to be insufficient. Then, if data must be read out from the area for the main routine, the data transfer is required. On the contrary, according to the first embodiment, the data of the first register file can be directly read out in the sub routine so that such trouble is never induced.

Figure 5:
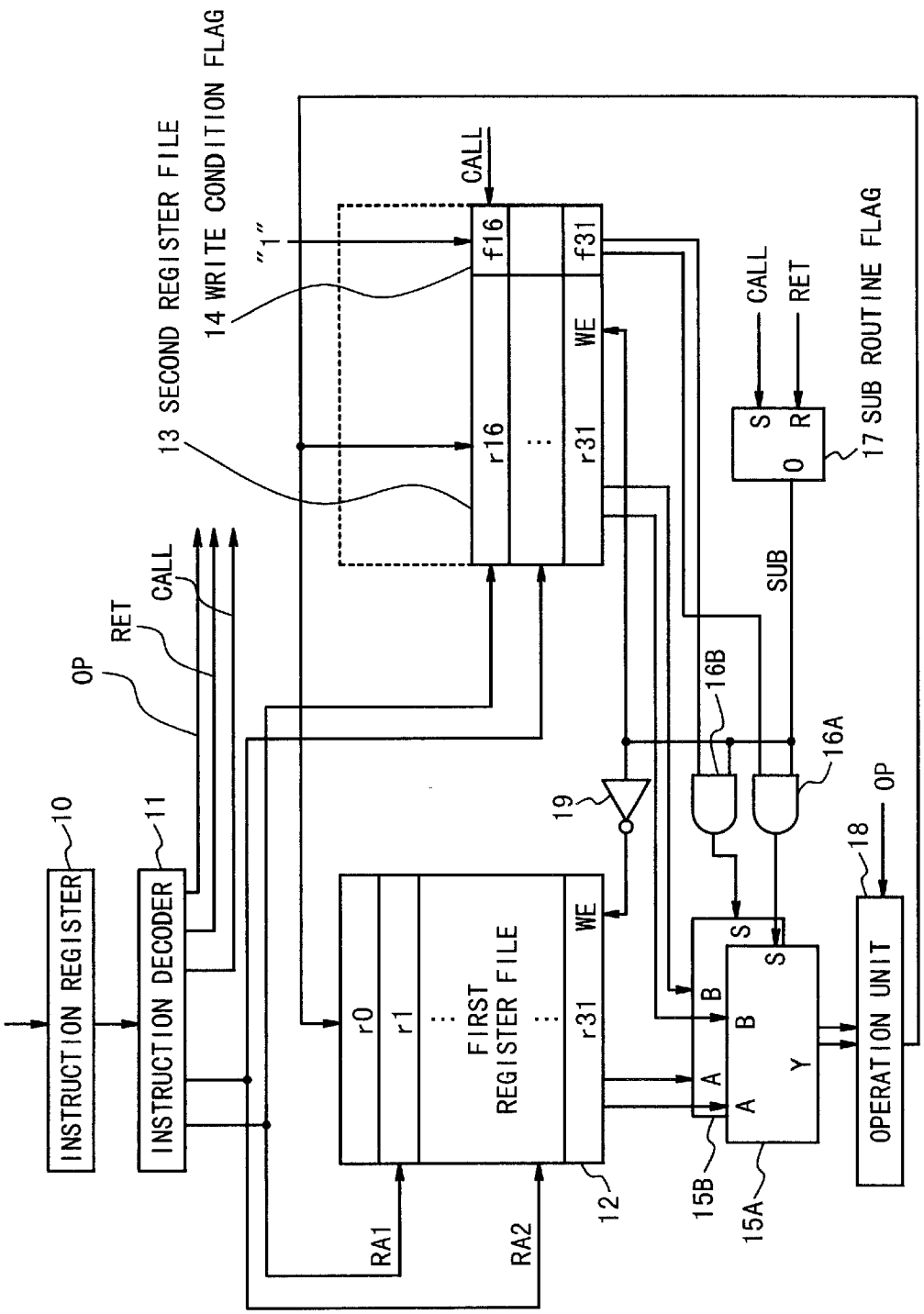
FIG. 5 is a block diagram showing a configuration of a variation of the information processor according to the first embodiment of the present invention.

In addition, in the first embodiment, the number of registers in the second register file 13 is equal to that of the first register file 12. However, as an example shown in FIG. 5, the number of registers in the second register file 13 can be half that of the first register file 12. In the typical application, about half of the register files is used as a parameter area and an address pointer area in which the bank switching is not necessary. Thus, this configuration provides a merit of reducing the number of registers in the entire register files. By the way, the number of registers in the second register file is not limited to be half that of the first register file. It can be arbitrarily determined in accordance with a request from a system to which this information processor is applied.

Second Embodiment

An information processor according to a second embodiment of the present invention is designed such that in the information processor according to the first embodiment, the operated result from the operation unit 18 can be written to the register in the second register file 13 and simultaneously written to a register having the same register address in the first register file 12.

Figure 6:
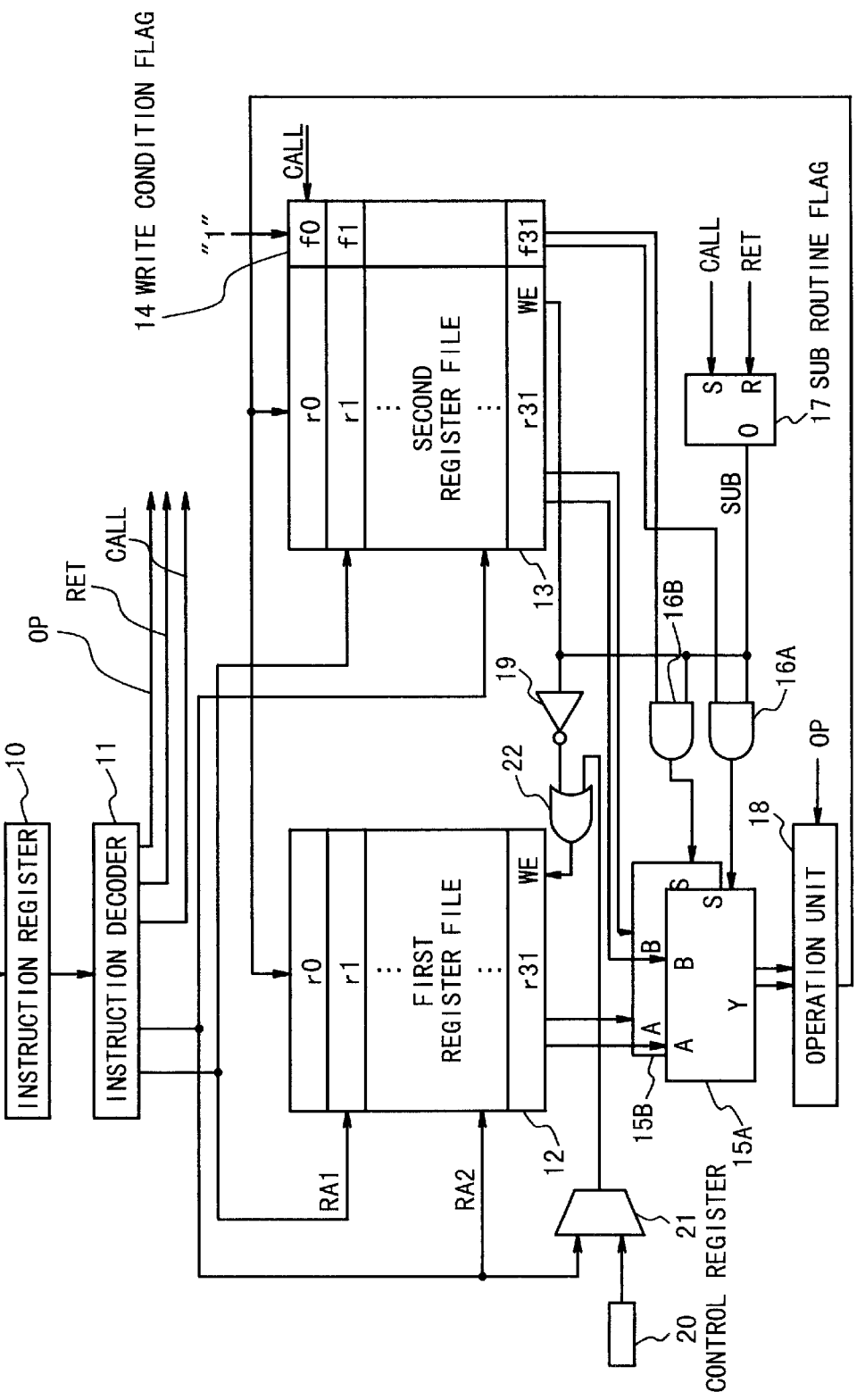
FIG. 6 is a block diagram showing a configuration of an information processor according to a second embodiment of the present invention.

FIG. 6 is a block diagram showing the constitution of the information processor according to this second embodiment. This information processor is designed such that a control register 20, a comparator 21 and an OR gate 22 are added to the information processor according to the first embodiment. Hereafter, only the points different from the information processor according to the first embodiment are described.

The control register 20 stores therein the register address of the register, which is targeted for the write of the operated result, within the first register file 12 and the second register file 13. This control register 20 may be designed so as to store the data from the operation unit 18 or may be designed so as to store the register address from the instruction decoder 11. An output of the control register 20 is sent to the comparator 21.

The comparator 21 compares the second register address RA2 from the instruction decoder 11 with the data from the control register 20. Then, if they agree with each other, the comparator 21 outputs "1" as a compared result signal, and if they do not agree, the comparator 21 outputs "0". This compared result signal is sent to the OR gate 22.

The OR gate 22 carries out the logical OR operation between a signal from the inverter 19 and the compared signal from the comparator 21, and then sends to the write enable terminal WE of the first register file 12.

Now, the operation of this information processor will be described below. Here, it is supposed that the control register 20 stores therein the second register address RA2 designating the register r19, and the main routine and the sub routine shown in FIG. 4 are executed in this situation. Also, it is assumed that the general move instruction "mov r30, r19" is stored instead of the special move instruction "mov' r30, r19" in the sub routine.

The operations of the respective instructions in the main routine and the sub routine are equal to those in the first embodiment except the operation of the move instruction "mov r30, r19" in the sub routine. Thus, only the operation of the move instruction "mov r30, r19" will be described below.

When the instruction fetching mechanism reads out the move instruction "mov r30, r19" from the main memory and stores in the instruction register 10, the instruction decoder 11 decodes the first operand designation section of the instruction to thereby generate the first register address RA1. This first register address is sent to the first register file 12, the second register file 13 and the write condition flag 14. Accordingly, the content of the register r30 is read out from the first output port of the first register file 12, and is sent to the input terminal A of the selector 15A. Also, the content of the register r30 is read out from the first output port of the second register file 13, and is sent to the input terminal B of the selector 15A. Moreover, the flag f30 is read out from the first output port of the write condition flag 14, and is sent to the AND gate 16A.

Similarly, the instruction decoder 11 decodes the second operand designation section of the instruction stored in the instruction register 10, and thereby generates the second register address RA2, and then sends to the first register file 12, the second register file 13 and the write condition flag 14. Thus, the content of the register r19 is read out from the second output port of the first register file 12, and is sent to the input terminal A of the selector 15B. Also, the content of the register r19 is read out from the second output port of the second register file 13, and is sent to the input terminal B of the selector 15B. Moreover, the flag f19 is read out from the second output port of the write condition flag 14, and is sent to the AND gate 16B.

Here, the sub routine flag 17 is at "1", and "1" as the flag f30 is read out from the first output port of the write condition flag 14. Thus, the AND gate 16A outputs "1". Accordingly, since the input terminal B of the selector 15A is selected, the content of the register r30 outputted from the first output port of the second register file 13 is sent to the operation unit 18 as the data of the first operand. Also, "0" as the flag f19 is read out from the second output port of the write condition flag 14. Hence, the AND gate 16B outputs "0". Accordingly, since the input terminal A of the selector 15B is selected, the content of the register r19 outputted from the second output port of the first register file 12 is sent to the operation unit 18 as the data of the second operand.

The operation unit 18, when recognizing the move instruction based on the operation signal OP from the instruction decoder 11, passes the data from the selector 15A, namely, the content of the register r30 in the second register file 13. The data outputted from the operation unit 18 is sent to the input terminals of the first register file 12 and the second register file 13.

At this time, since the sub routine flag 17 is at "1", "1" is sent to the write enable terminal WE of the second register file 13. Also, the second register address RA2 from the instruction decoder 11 is the address for designating the register r19, and the control register 20 stores therein the address for designating the register r19. So, the comparator 21 outputs "1". Thus, "1" is outputted from the OR gate 22, and sent to the write enable terminal WE of the first register file 12. Hence, the data passed through the operation unit 18 is written to both the register r19 specified by the second register address RA2 in the first register file 12 and the register r19 specified by the second register address RA2 in the second register file 13. Then, the execution of the move instruction "mov r30, r19" is completed.

As mentioned above, in the information processor according to the second embodiment, when the register having the register address stored in the control register 20 is designated as the target register, the data is written to both the registers in the first register file 12 and the second register file 13. As a result, it is not necessary to equip the special move instruction, such as the special move instruction "mov' r30, r19" used in the first embodiment.

Third Embodiment

An information processor according to a third embodiment of the present invention equips three register files. In this information processor, a sub routine (hereafter, referred to as a second sub routine) can be called from another sub routine (hereafter, referred to as a first sub routine).

Figure 7:
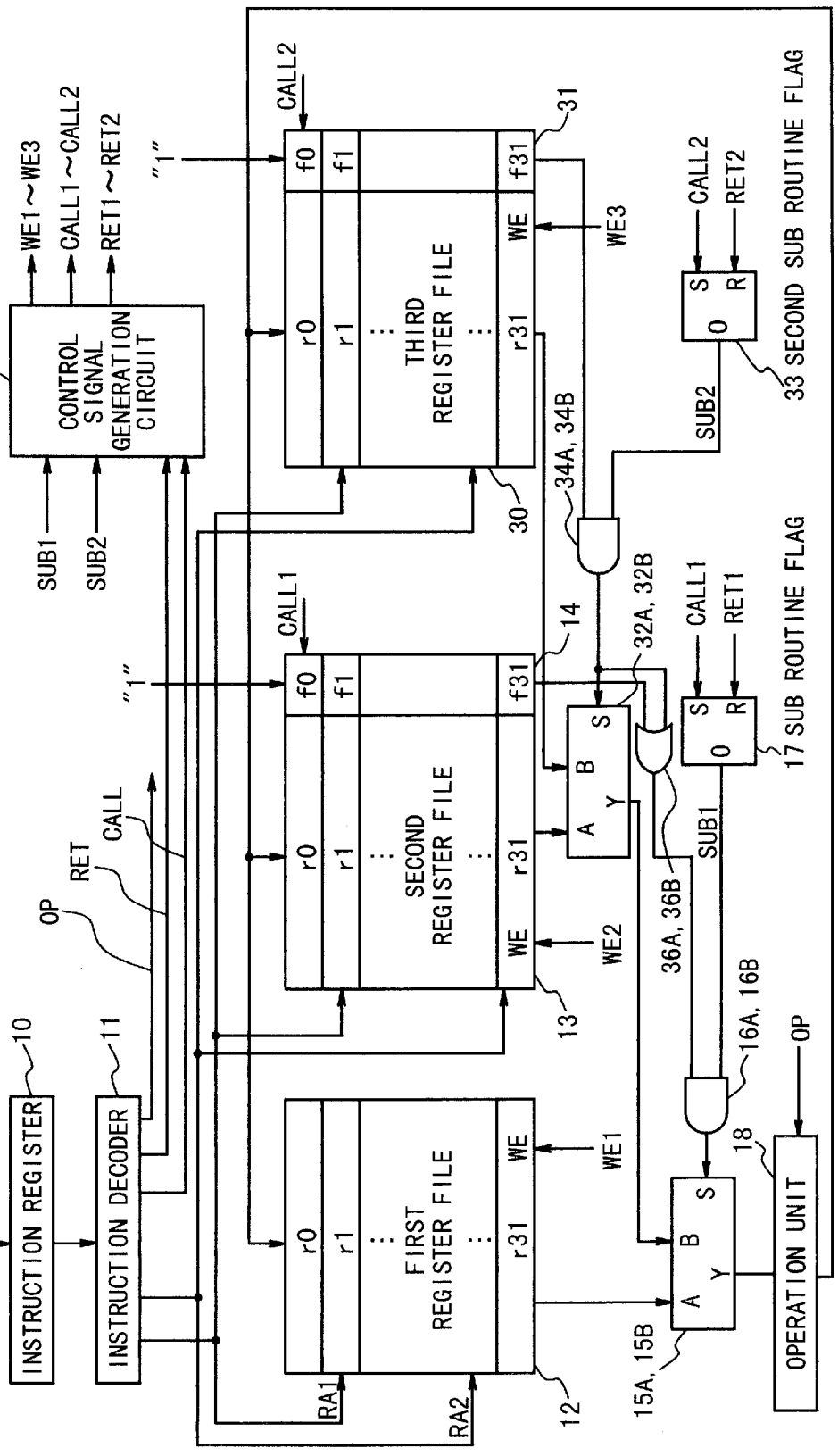
FIG. 7 is a block diagram showing a configuration of an information processor according to a third embodiment of the present invention.

FIG. 7 is a block diagram showing the configuration of the information processor according to the third embodiment. In this information processor, the inverter 19 is removed from the information processor shown in FIG. 3. Also, a third register file 30, an write condition flag 31, selectors 32A, 32B, a second sub routine flag 33, AND gates 34A, 34B, a control signal generation circuit 35 and OR gates 36A, 36B are added to the information processor shown in FIG. 3.

In FIG. 7, one selector symbol is shown as the selectors 15A, 15B in order to avoid the complexity in the drawing. Actually, the two selectors should be shown by using the two symbols as shown in FIG. 3. Also, one AND gate symbol is shown as the AND gates 16A, 16B. Actually, the two AND gates should be shown by using the two symbols as shown in FIG. 3. Moreover, the OR gates 36A, 36B should be also shown by using the two symbols for the two OR gates. Hereafter, the same reference numbers are given to the parts equal or corresponding to those of the information processor according to the first embodiment. So, the explanations are omitted or simplified. Then, the different portions are mainly described.

The control signal generation circuit 35 generates control signals based on the signal CALL and the signal RET from the instruction decoder 11, a signal SUB1 from the sub routine flag 17 and a signal SUB2 from the second sub routine flag 33. The control signals include a write enable signal WE1 sent to the first register file 12, a write enable signal WE2 sent to the second register file 13, a write enable signal WE3 sent to the third register file 30, a signal CALL1 sent to the write condition flag 14 and the sub routine flag 17, a signal CALL2 sent to the write condition flag 31 and the second sub routine flag 33, a signal RET1 sent to the sub routine flag 17 and a signal RET2 sent to the second sub routine flag 33. The meanings of the control signals will be discussed on each occurrence.

The first register file 12 is set to write enable state by the write enable signal WE1 from the control signal generation circuit 35. The control signal generation circuit 35 sets the write enable signal WE1 to "1" when the main routine is being executed, namely, when both the signals SUB1, SUB2 are at "0".

The selector 15A selects one of a data from the first output port of the first register file 12 and a data from the selector 32A, in accordance with the selection signal from the AND gate 16A, and sends the selected data as a data of the first operand to the operation unit 18. Here, the AND gate 16A performs a logical AND operation between the signal SUB1 from the sub routine flag 17 and a signal from the OR gate 36A. Also, the OR gate 36A performs a logical OR operation between the signal from the first output port of the write condition flag 14 and a signal from the AND gate 34A.

The selector 15B selects one of a data from the second output port of the first register file 12 and a data from the selector 32B, in accordance with a select signal from the AND gate 16B, and sends the selected data as a data of the second operand to the operation unit 18. Here, the AND gate 16B performs a logical AND operation between the signal SUB1 from the sub routine flag 17 and a signal from the OR gate 36B. Also, the OR gate 36B performs a logical OR operation between the signal from the second output port of the write condition flag 14 and a signal from the AND gate 34B.

A data from the first output port of the second register file 13 is sent to an input terminal A of the selector 32A, and a data from the second output port is sent to an input terminal A of the selector 32B. Also, this second register file 13 is set to write enable state by the write enable signal WE2 from the control signal generation circuit 35. The control signal generation circuit 35 sets the write enable signal WE2 to "1", while the first sub routine is executed, namely, when the signal SUB1 is at "1" and the signal SUB2 is at "0".

Also, all flags constituting the write condition flag 14 are all cleared to "0", when the signal CALL1 is set to "1". The control signal generation circuit 35 sets the signal CALL1 to "1", when the call instruction is executed in the main routine, namely, when both the signals SUB1, SUB2 are at "0" and further the instruction decoder 11 outputs the signal CALL.

The configuration of the third register file 30 is equal to that of the second register file 13. The third register file 30 is used when the second sub routine is executed. A content of a register specified by the first register address RA1 is read out from the first output port of this third register file 30, and sent to the input terminal B of the selector 32A. Also, a content of a register specified by the second register address RA2 is read out from the second output port of this third register file 30, and sent to the input terminal B of the selector 32B. Also, this third register file 30 is set to write enable state by the write enable signal WE3 from the control signal generation circuit 35. The control signal generation circuit 35 sets the write enable signal WE3 to "1", while the second sub routine is executed, namely, when the signal SUB1 is at "1" and further the signal SUB2 is at "1".

The configuration of the write condition flag 31 is equal to that of the write condition flag 14. A flag specified by the first register address RA1 is read out from the first output port of this write condition flag 31, and sent to the AND gate 34A. Also, a flag specified by the second register address RA2 is read out from the second output port of this write condition flag 31, and sent to the AND gate 34B. Also, the flag specified by the second register address RA2 in the write condition flag 31 is set to "1" when an instruction involving a write operation is a executed at the state "1" of the write enable signal WE3. Moreover, all the flags constituting the write condition flag 31 are all cleared to "0" when the signal CALL2 is set to "1". The control signal generation circuit 35 sets the signal CALL2 to "1" when the call instruction is executed in the first sub routine, namely, when the signal SUB1 is at "1" and the signal SUB2 is at "0" and further the instruction decoder 11 outputs the signal CALL.

The selector 32A selects one of the data from the first output port of the second register file 13 and the data from the first output port of the third register file 30, in accordance with the selection signal from the AND gate 34A, and sends the selected data to the input terminal B of the selector 15A. Here, the AND gate 34A performs a logical AND operation between the signal SUB2 from the second sub routine flag 33 and the signal from the first output port of the write condition flag 31.

The selector 32B selects one of the data from the second output port of the second register file 13 and the data from the second output port of the third register file 30, in accordance with the selection signal from the AND gate 34B, and sends the selected data to the input terminal B of the selector 15B. Here, the AND gate 34B performs a logical ANS operation between the signal SUB2 from the second sub routine flag 33 and the signal from the second output port of the write condition flag 31.

The sub routine flag 17 is set to "1" during the execution of the first and second sub routines, and cleared to "0" during the execution of the main routine. That is, this sub routine flag 17 is set to "1" by the signal CALL1, and cleared to "0" by the signal RET1. The control signal generation circuit 35 sets the signal RET1 to "1" when the return instruction is executed in the first sub routine, namely, when the signal SUB1 is at "1" and the signal SUB2 is at "0" and further the instruction decoder 11 outputs the signal RET.

The second sub routine flag 33 stores therein the state as to whether or not the second sub routine is being executed. This second sub routine flag 33 is set to "1" during the execution of the second sub routine, and cleared to "0" during the execution of the main routine and the first sub routine. Actually, this second sub routine flag 33 is set to "1" by the signal CALL2, and cleared to "0" by the signal RET2. The control signal generation circuit 35 sets the signal RET2 to "1" when the return instruction is executed in the second sub routine, namely, when the signal SUB2 is at "1" and further the instruction decoder 11 outputs the signal RET. The signal SUB2 from this second sub routine flag 33 is sent to the AND gates 34A, 34B.

The AND gate 34A carries out the logical AND operation between the signal from the first output port of the write condition flag 31 and the signal SUB2 from the second sub routine flag 33, and sends the result to the select terminal S of the selector 32A and the OR gate 36A. The AND gate 34A outputs "0" since the signal SUB2 from the second sub routine flag 33 is at "0" during the execution of the first sub routine. Accordingly, the input terminal A of the selector 32A is selected. Thus, during the execution of the first sub routine, the data from the first output port of the second register file 13 is sent to the operation unit 18 through the selector 15A as the data of the first operand.

On the other hand, the signal SUB2 from the second sub routine flag 33 is at "1" during the execution of the second sub routine. So, an output of the AND gate 34A is determined by the signal from the first output port of the write condition flag 31. That is, if the signal from the first output port of the write condition flag 31 is at "0" (the non-written state), the AND gate 34A outputs "0". Accordingly, since the input terminal A of the selector 32A is selected, the data from the first output port of the second register file 13 is sent to the operation unit 18 through the selector 15A as the data of the first operand. Contrarily, if the signal from the first output port of the write condition flag 31 is at "1" (the already-written state), the AND gate 34A outputs "1". So, since the input terminal B of the selector 32A is selected, the data from the first output port of the third register file 30 is sent to the operation unit 18 through the selector 15A as the data of the first operand.

Similarly, the AND gate 34B carries out the logical AND operation between the signal from the second output port of the write condition flag 31 and the signal SUB2 from the second sub routine flag 33, and sends the result to the select terminal S of the selector 32B. The AND gate 34B outputs "0" since the signal SUB2 from the second sub routine flag 33 is at "0" during the execution of the first sub routine. Accordingly, the input terminal A of the selector 32B is selected. Thus, during the execution of the first sub routine, the data from the second output port of the second register file 13 is sent to the operation unit 18 through the selector 15B as the data of the second operand.

On the other hand, the signal SUB2 from the second sub routine flag 33 is at "1" during the execution of the second sub routine. So, an output of the AND gate 34B is determined by the signal from the second output port of the write condition flag 31. That is, if the signal from the second output port of the write condition flag 31 is at "0" (the non-written state), the AND gate 34B outputs "0". Accordingly, since the input terminal A of the selector 32B is selected, the data from the second output port of the second register file 13 is sent to the operation unit 18 through the selector 15B as the data of the second operand. Contrarily, if the signal from the second output port of the write condition flag 31 is at "1" (the already-written state), the AND gate 34B outputs "1". Accordingly, since the input terminal B of the selector 32B is selected, the data from the second output port of the third register file 30 is sent to the operation unit 18 through the selector 15B as the data of the second operand.

Now, the operation of the information processor having the above-mentioned configuration will be described below. The operation, in which the first sub routine is called from the main routine and then the operational flow returns back to the main routine, is identical to that of the first embodiment. Thus, hereafter, an operation is exemplified in which the second sub routine is called by executing the call instruction in the first sub routine, and an add instruction "add r20, r30" is executed in the second sub routine, and then the operational flow returns back to the first sub routine.

When the instruction fetching mechanism reads out the call instruction from the main memory and stores in the instruction register 10, the process for storing in the data saving register the second register address RA2 to specify the register for storing therein the function return value and the process for storing in the address saving register the instruction address of a next instruction are firstly carried out as mentioned in the first embodiment.

Also, the instruction decoder 11 decodes the operation code section of the instruction stored in the instruction register 10, and thereby generates the signal CALL representative of the call instruction, and then sends to the control signal generation circuit 35. In response to this signal CALL, the control signal generation circuit 135 generates the signal CALL2, and sends to the write condition flag 31 and the second sub routine flag 33. Accordingly, all the flags in the write condition flag 31 are cleared to "0". Also, the second sub routine flag 33 is set to "1". Then the execution of the call instruction is completed through the above-mentioned operations, and the execution of the second sub routine is started from a next instruction cycle.

In the second sub routine, the instruction fetching mechanism reads out the add instruction "add r20, r30" from the main memory, and stores in the instruction register 10. The instruction decoder 11 decodes the first operand designation section of the instruction stored in the instruction register 10, and thereby generates the first register address RA1 specifying the register r20, and then sends to the first register file 12, the second register file 13, the third register file 30, the write condition flag 14 and the write condition flag 31. Accordingly, the content of the registers r20 are read out from the respective first output ports of the first register file 12, the second register file 13 and the third register file 30, and sent to the input terminal A of the selector 15A, the input terminal A of the selector 32A and the input terminal B of the selector 32A, respectively. Also, the flags f20 are read out from the respective first output ports of the write condition flag 14 and the write condition flag 31, and sent to the OR gate 36A and the AND gate 34A, respectively.

Similarly, the instruction decoder 11 decodes the second operand designation section of the instruction stored in the instruction register 10, and thereby generates the second register address RA2 specifying the register r30, and then sends to the first register file 12, the second register file 13, the third register file 30, the write condition flag 14 and the write condition flag 31. Accordingly, the content of the registers r30 are read out from the respective second output ports of the first register file 12, the second register file 13 and the third register file 30, and sent to the input terminal A of the selector 15B, the input terminal A of the selector 32B and the input terminal B of the selector 32B, respectively. Also, the flags f30 are read out from the respective second output ports of the write condition flag 14 and the write condition flag 31, and sent to the OR gate 36B and the AND gate 34B, respectively.

Here, the data of the first and second operands are obtained as follows. That is, whether or not the data from the second register file 13 is selected is determined depending on whether or not the data is stored in the third register file 30 (whether or not the write condition flag 31 is at "1". The data from the first register file 12 is selected if the data is not stored in any one of the second register file 13 and the third register file 30 (if any one of the write condition flags 14, 31 is not at "0"). Then, the data of the first and second operands are generated.

Actually, since the sub routine flags 17, 33 are both at "1", if the flag f20 from the first output port of the write condition flag 14 and the flag f20 from the first output port of the write condition flag 31 are both at "0", the AND gate 16A outputs "0". Hence, the input terminal A of the selector 15A is selected. As a result, the content of the register r20 read out from the first output port of the first register file 12 is sent to the operation unit 18 as the data of the first operand. It should be noted that the data are ignored which are read out from the respective registers r20 of the second register file 13 and the third register file 30.

If the flag f20 from the first output port of the write condition flag 14 is at "1", the OR gate 36A outputs "1", irrespectively of the state of the flag f20 from the first output port of the write condition flag 31. Thus, the AND gate 16A outputs "1". So, the input terminal B of the selector 15A is selected. Also, since the AND gate 34A outputs "1", the input terminal A of the selector 32A is selected. As a result, the content of the register r20 read out from the first output port of the second register file 13 is sent to the operation unit 18, as the data of the first operand, through the selectors 32A, 15A.

Moreover, if the flag f20 from the first output port of the write condition flag 14 is at "0" and the flag f20 from the first output port of the write condition flag 31 is at "1", the AND gate 34A outputs "1". So, the input terminal B of the selector 32A is selected. Also, since the AND gate 34A outputs "1", the OR gate 36A outputs "1". Accordingly, since the AND gate 16A outputs "1", the input terminal B of the selector 15A is selected. As a result, the content of the register r20 read out from the first output port of the third register file 30 is sent to the operation unit 18, as the data of the first operand, through the selectors 32A, 15A.

The operations in the case of obtaining the data of the first operand are explained. The data of the second operand is also obtained by using the same manner.

The operation unit 18 adds the data from the selector 15A and the data from the selector 15B, and sends the result to the respective input terminals of the first register file 12, the second register file 13 and the third register file 30. At this time, the sub routine flag 17 is at "1", and the second sub routine flag 33 is at "1". Accordingly, the write enable signal WE3 from the control signal generation circuit 35 is set to "1". Thus, the operated result is written to the register r30 specified by the second register address RA2, within the third register file 30. At the same time, the flag f30 in the write condition flag 31 is set to "1".

Due to the mentioned above operations, if the first operand data is read out from the register r20 in the first register file 12 and the second operand data is read out from the register r30 in the second register file 13, the content of the register r20 in the first register file 12 and the content of the register r30 in the second register file 13 are added, and the result is stored in the register r30 in the third register file 30. Then, the execution of the add instruction "add r20, r30" is completed.

On the other hand, the flag f30 in the write condition flag 31 is already set to "1" if the writing operation is done to the register r30 in the third register file 30. In this case, the input terminal B of the selector 32B is selected since "1" is outputted from the AND gate 34B. As a result, the data from the register r30 of the third register file 30 is selected by the selector 32B, and sent to the operation unit 18 through the selector 15B as the data of the second operand.

The operation unit 18 executes the operation similarly to the above-mentioned cases. Then, this operated result of the add instruction is written to the register r30 specified by the second register address RA2, within the third register file 30. That is, the content of the register r20 in the first register file 12 and the content of the register r30 in the third register file 30 are added, and the result is stored in the register r30 in the third register file 30. Then, the execution of the add instruction "add r20, r30" is completed.

Next, the instruction fetching mechanism reads out the return instruction from the main memory, and stores in the instruction register 10. Then, the instruction decoder 11 decodes the operation code section of the instruction stored in the instruction register 10, and thereby generates the signal RET representative of the return instruction, and then sends to the control signal generation circuit 35. In response to this signal RET, the control signal generation circuit 35 generates the signal RET2, and sends to the second sub routine flag 33. Accordingly, the second sub routine flag 33 is cleared to "0". Then, the execution of the return instruction is completed. After that, the execution of the first sub routine is started from a next instruction cycle by using the second register file 13.

Figure 8:
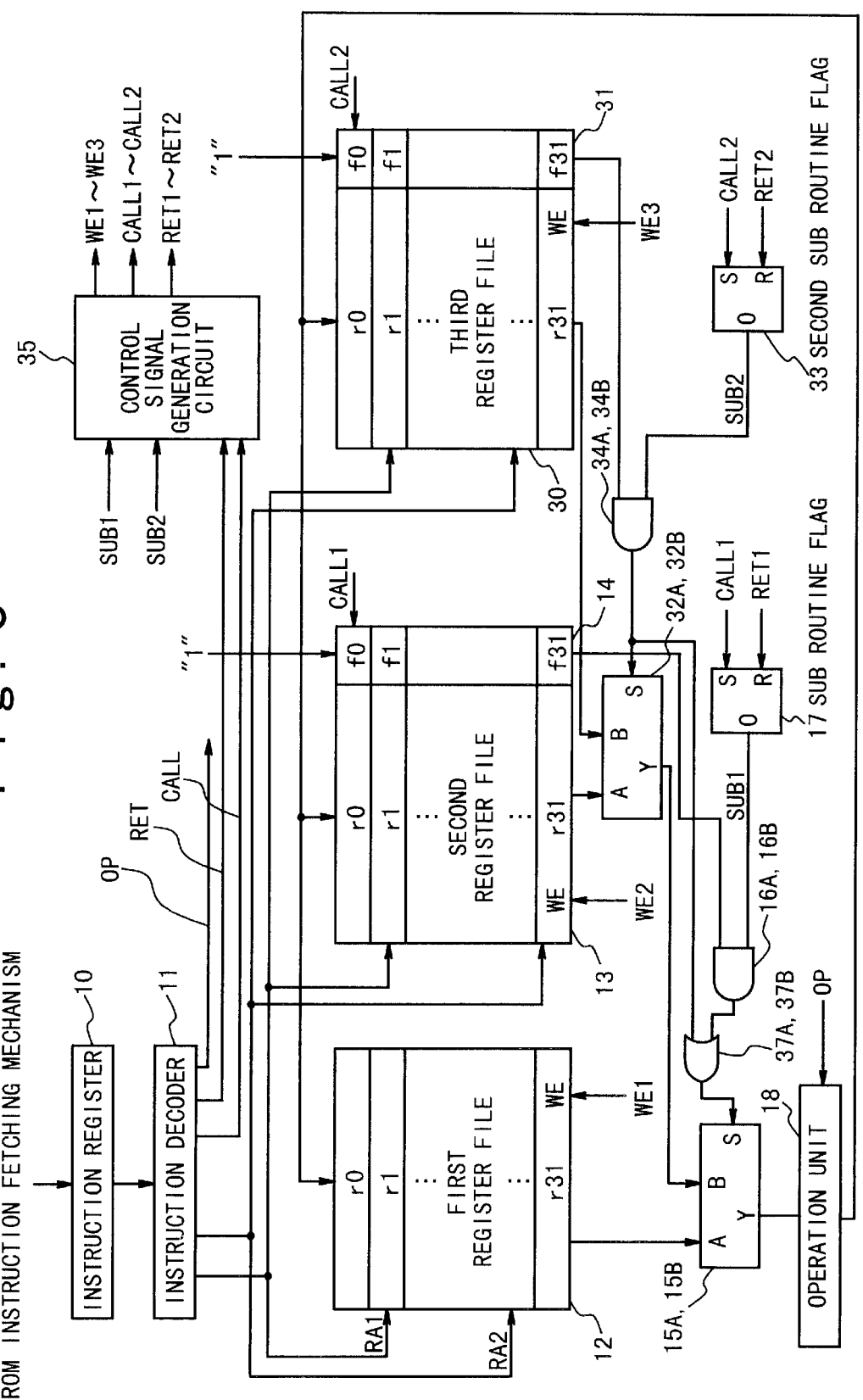
FIG. 8 is a block diagram showing a variation of the information processor shown in FIG. 7.

The above-mentioned information processor according to the third embodiment can be varied as shown in FIG. 8.

In an information processor shown in FIG. 8, the OR gates 36A, 36B shown in FIG. 7 are removed, and OR gates 37A, 37B are added instead of them. Even this case can attain the functions similar to those of the information processor shown in FIG. 7.

According to the information processor in the third embodiment, the three register files can be switched under little overhead to thereby enable the fast data processing.

In the third embodiment, the information processor equipping the three register files has been described. However, an information processor equipping four or more register files can be designed by suitably adding the register file, the selector, the AND gate and the sub routine flag.

Also, the information processor for processing the two-operand instruction has been exemplified in the first to third embodiments. However, the present invention can be applied to an information processor for processing an instruction of a one-operand type or a three-operand type. Also, the dual port RAM has been exemplified as the register file, in the first to third embodiments. However, the present invention can be applied to a RAM having one or three or more ports. In this case, the numbers of the selectors and the AND gates can be determined in accordance with the number of ports. Also, the register file is not limited to the RAM. So, it may be composed of usual registers, flip-flops or the like. Moreover, the executions of the respective instructions can be done in various processing manners, such as a sequential process, a pipe line process and the like.

As detailed above, according to the present invention, it is possible to provide the information processor and the method for switching the register files which can quickly switch the register files without the influence of the number of parameters to be exchanged.

What is claimed is:

1. An information processor comprising:
a first register file which is used when a first instruction is executed;
a second register file which is used when a second instruction is executed;
a controller which activates said second register file and deactivates said first register file, when said second instruction is called from said first instruction;
a first path which transfers a data read from said first register file if the data used by said second instruction is not written in said second register file activated by said controller when said second instruction is executed;
a second path which transfers the data read from said second register file if the data used by said second instruction is written in said second register file activated by said controller when said second instruction is executed; and
a third path which transfers an execution result obtained by executing said second instruction based on the data transferred from one of said first path and said second path to write into said second register file.

2. An information processor according to claim 1, further comprising:
an write condition flag which is set when said execution result of said second instruction is written into said second register file, and
wherein the data used by said second instruction is obtained from said first path if said write condition flag is not set, and is obtained from said second path if said write condition flag is set.

3. An information processor according to claim 2, wherein said write condition flag is cleared when said second instruction is called from said first instruction.

4. An information processor according to claim 3, wherein the number of registers included in said first register file is equal to the number of registers included in said second register file.

5. An information processor according to claim 3, wherein said first register file includes a first register area which is not referred when said second instruction is executed and a second register area which can be referred when said second instruction is executed, and
said second register file includes a register area corresponding to said second register area.

6. An information processor according to claim 1, wherein said first register file and said second register file are formed of RAMs.

7. An information processor according claims 3, further comprising:
a fourth path which transfers said execution result obtained by executing said second instruction based on the data transferred from one of said first path and said second path to write into said first register file.

8. An information processor comprising:
a plurality of register files which are used when a plurality of instructions are executed, respectively;
a controller which when an instruction is called from another instruction, activates one of said plurality of register files corresponding to said instruction and deactivates remaining ones of said plurality of register files corresponding to said other instruction;
a first path which transfers a data read from one of said remaining register files if the data used by said instruction is not written in said one register file activated by said controller when said instruction is executed;
a second path which transfers the data read from said one register file if the data used by said instruction is written in said one register file activated by said controller when said instruction is executed; and
a third path which transfers an execution result obtained by executing said instruction based on the data transferred from one of said first path and said second path to write into said activated one register file.

9. An information processor according to claim 8, further comprising:
an write condition flag which is set if said execution result of said instruction is written to said activated one register file, and
wherein the data used by said instruction is obtained from said first path if said write condition flag is not set, and is obtained from said second path if said write condition flag is set.

10. An information processor according to claim 9, wherein said write condition flag is cleared when said instruction is called from said other instruction.

11. A register file switching method in an information processor having a first register file used when a first instruction is executed and a second register file used when a second instruction is executed, comprising:
(a) activating said second register file and deactivating said first register file, when said second instruction is called from said first instruction;
(b) transferring a data read from said first register file if the data used by said second instruction is not written in said second register file activated at said step (a) when said second instruction is executed;
(c) transferring the data read from said second register file if the data used by said second instruction is written in said second register file activated at said step (a) when said second instruction is executed; and
(d) transferring an execution result obtained by executing said second instruction based on the data obtained at one of said step (b) and said step (c) to write into said second register file.

12. A register file switching method in an information processor according to claim 11, further comprising:
setting an write condition flag if said execution result of said second instruction is written into said second register file, and
wherein the data used by said second instruction is obtained at said step (b) if said write condition flag is not set, and is obtained at said step (c) if said write condition flag is set.

13. A register file switching method in an information processor according to claim 12, wherein said write condition flag is cleared when said second instruction is called from said first instruction.

14. A register file switching method in an information processor according to claim 13, further comprising:
transferring said execution result obtained by executing said second instruction based on the data obtained at one of said step (b) and said step (c) to write into said first register file.

15. A register file switching method in an information processor having a plurality of register files which are used when a plurality of instructions are executed respectively, comprising:

(a) when an instruction is called from another instruction, activating one of said plurality of register files corresponding to said instruction and deactivating remaining ones of said plurality of register files corresponding to said other instruction;
(b) transferring a data read from one of said remaining register files if the data used by said instruction is not written in said one register file activated at said step (a) when said instruction is executed;
(c) transferring the data read from said one register file if the data used by said instruction is written in said one register file activated at said step (a) when said instruction is executed; and
(d) transferring an execution result obtained by executing said instruction based on the data obtained at one of said step (b) and said step (c) to write into said activated one register file.

16. A register file switching method in an information processor according to claim 15, further comprising:
setting an write condition flag if said execution result of said instruction is written to said activated one register file, and
wherein the data used by said instruction is obtained at said step (b) if said write condition flag is not set, and is obtained at said step (c) if said write condition flag is set.

17. A register file switching method in an information processor according to claim 16, wherein said write condition flag is cleared when said instruction is called from said other instruction.

18. An information processor comprising:
a first register file which is used when a first instruction is executed;
a second register file which is used when a second instruction is executed;
a controller which activates said second register file and deactivates said first register file, when said second instruction is called from said first instruction; and
an executing section which receives a data transferred from said first register file if the data used by said second instruction is not written in said second register file activated by said controller when said second instruction is executed, the data transferred from said second register file if the data used by said second instruction is written in said second register file activated by said controller when said second instruction is executed, executes said second instruction based on the received data, and writes an execution result obtained by executing said second instruction into said second register file.

* * * * *